April 3, 1951   A. E. HAGUE   2,547,525
RECORDER CHECKING DEVICE
Filed Oct. 21, 1948
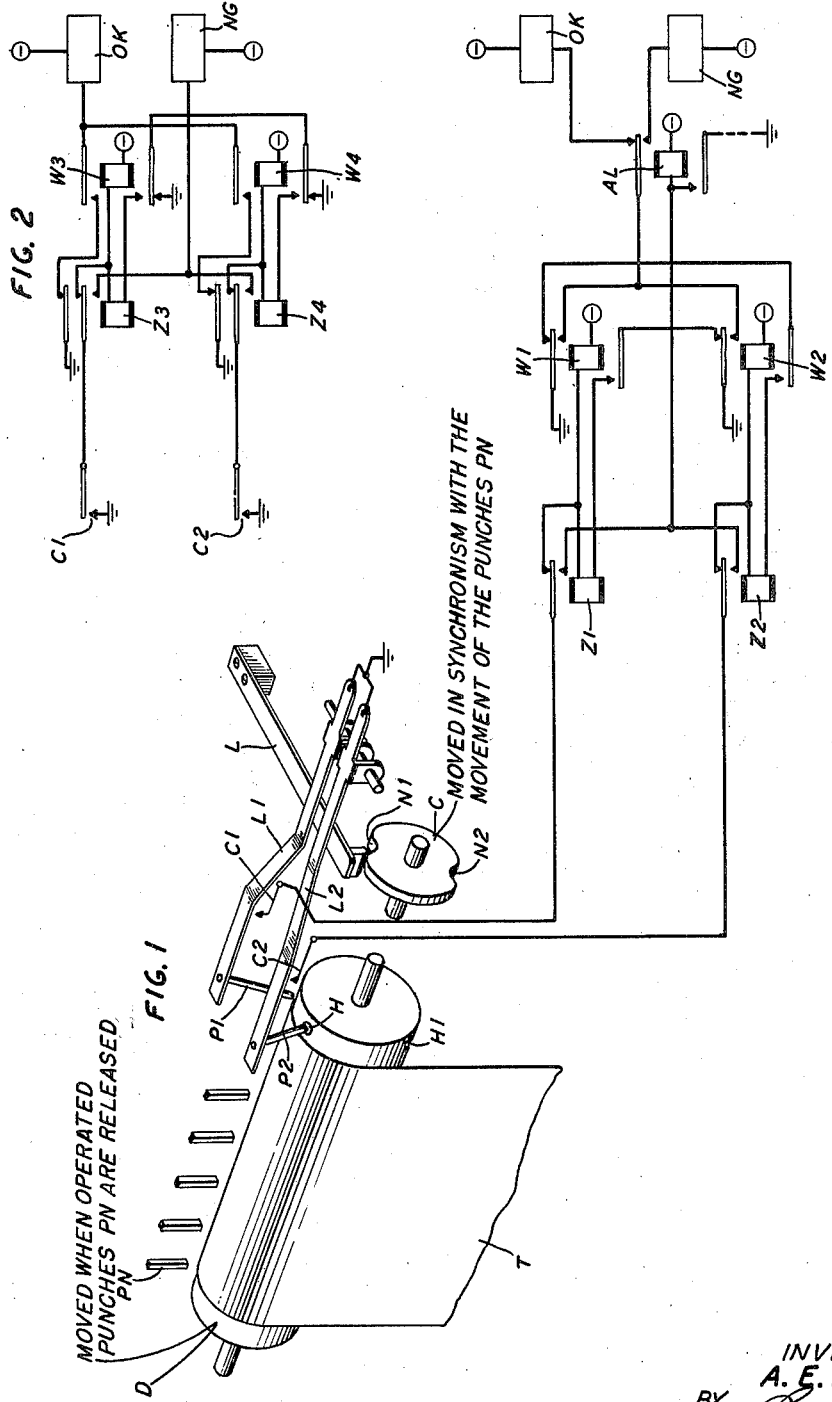
INVENTOR
A. E. HAGUE
BY
ATTORNEY Patented Apr. 3, 1951

2,547,525

UNITED STATES PATENT OFFICE 2,547,525

RECORDER CHECKING DEVICE

Alfred E. Hague, West Orange, N. J., assignor to Bell Telephone Laboratories, Incorporated, New York, N. Y., a corporation of New York Application October 21, 1948, Serial No. 55,727

4 Claims. (Cl. 177—311)

1

This invention relates to recording devices and more particularly to the record-feeding means of such devices.

In many recording devices, such for example, as the recorder and record senser disclosed in the copending application of W. W. Carpenter, Serial No. 588,401 filed April 14, 1945, records are made by impressing a paper tape or similar recording medium in successive lines, the recording medium being advanced a step after each impression thereof. If the record-feeding means fails to step even once in the course of these operations, two lines of impressions are superimposed. Then not only is a line of the record rendered illegible, but the information that should have been recorded in the succeeding line is lost and the intelligibility of the entire record may be impaired. In such devices, therefore, it is important that some means be provided to give an immediate indication if the record-feeding means fails to step. However, in the operation of these devices, the movements of the punches which impress the tape and the stepping movements of the record-feeding means occur in rapid succession. Any indicating device which imposes a load on the record-feeding means increases the liability of failure of said means to step.

The present invention discloses a novel means for indicating failure of the record-feeding means to step, which also gives a positive indication of normal operation of the record-feeding means and imposes no load thereon which would tend to interfere with the stepping movements of said record-feeding means.

A feature of the invention is that the means for producing indications of normal operation and of failure of such normal operation comprises a counting relay circuit whose operation is controlled by feeler members periodically contacting the record-feeding means.

The features of the invention, its construction, and its operation will be understood from the description which follows, the appended claims, and the drawing, in which Fig. 1 shows one embodiment of the invention and Fig. 2 shows an alternate arrangement of the electrical indicating circuit shown in Fig. 1.

In Fig. 1. T is the recording medium which is impressed by the punches PN to produce the record. The recording medium T is carried by the drum D and caused to adhere thereto by any suitable means so that when the drum D is turned, the recording medium T is advanced thereby. Each time the punches PN are operated to impress the recording medium T and released, the drum D is turned by suitable mechanism (not shown) so that when the punches PN are again operated, they impress the medium T at another portion thereof. Reference may be had to the above-mentioned copending application of W. W. Carpenter for a more complete description of a recording device of this kind. For the purpose of illustration in the present embodiment of the invention, it is assumed that each turning movement or step of the drum D is one-half a revolution thereof. It will be apparent that this assumption is made only by way of illustration and that, in practice, the drum D may move at each step through any desired angle.

In accordance with the present embodiment of the invention, a cam C is rotatably mounted in any convenient location and arranged to be rotated by any suitable means in synchronism with the movements of the punches PN. A spring follower L coacts with said cam so that when said follower encounters the raised portions thereof, it raises the pins P1 and P2 clear of the drum D, and when said follower encounters the depressed portion of said cam, it allows the pins P1 and P2 to fall upon the drum D. Cam C is so mounted upon its support and is rotated in such a manner that each time the punches PN are about to be operated to impress the medium T, the pins P1 and P2 fall upon the drum D. Cam C and follower L are shown only by way of illustration as it is obvious that other means may be used to raise and lower the pins P1 and P2.

Holes H and H1 are formed in the drum D and so located therein that, when drum D is in one of its recording positions, the pin P2, when lowered, falls into the hole H and contacts C2 are thereby closed, whole pin P1 strikes the surface of drum D and contacts C1 are not closed. In the other recording position of the drum D, pin P1 when lowered, falls into the hole H1, closing the contacts C1, while pin P2 strikes the surface of the drum D and contacts C2 are not closed. Suitable notches in the drum D may be substituted for the holes H and H1, or holes or notches may be suitably formed in a separate member attached to or arranged to rotate with drum D. The relays W1, W2, Z1 and Z2 are arranged to respond to the closures of the contacts C1 and C2, as described below.

Assume, now, that the drum D is in the position shown and that the punches PN are about to be actuated to impress the medium T. At this time, follower L encounters a depression in cam C and allows pins P1 and P2 to fall. Pin P1 strikes the surface of drum D and contacts C1 are not closed. Pin P2, however, falls into the hole H, closing contacts C2. Relay W2 thereupon operates over a circuit extending from battery through the winding of said relay, back contacts of relay Z2, and contacts C2 to ground. The indicator or other device OK which may be of any suitable form, is thereby actuated by ground through the upper front contacts of relay W2 and upper back contacts of relay AL, to battery through the electro-responsive portion of the device OK. It will be noted that upon the operation of relay W2 as above described, a short circuiting path is established for relay Z2 extending from ground through the upper back contacts of relay W1, lower contacts of relay W2 to one side of the winding of relay Z2, and from ground on contacts C2, normal contacts of relay Z2 to the other side of the winding of relay Z2.

As the punches PN are now withdrawn and cam C continues to rotate, the follower L encounters a raised portion of said cam and raises pins P1 and P2. Contacts C2 are thereby opened. Relay Z2 thereupon operates in series with relay W2 through lower contacts of relay W2 and upper back contacts of relay W1 to ground. The drum D should now be stepped a half revolution in preparation for the next recording operation. When the follower L now encounters a depressed portion of cam C, it again allows pins P1 and P2 to fall. If the drum D has stepped properly, pin P2 strikes the surface of said drum and contacts C2 are not closed, but pin P1 falls into the hole H1, closing contacts C1. Relay W1 thereupon operates over a circuit extending from battery through the winding of said relay, back contacts of relay Z1, and contacts C1 to ground. The circuit of relay W2 and Z2 is thereby opened at the upper back contacts of relay W1 and said relays release. The indicator OK is actuated by ground through upper front contacts of relay W1 and back contacts of relay AL, indicating that the drum D has stepped properly. It will be noted also that upon the operation of relay W1 as above described, a short circuiting path is established for relay Z1 extending from ground on the upper back contacts of relay W2, lower contacts of relay W1 to one side of the winding of relay Z1, and from ground on contacts C1, back contacts of relay Z1 to the other side of the winding of said relay Z1.

However, if drum D has not turned from its previous position when the pins P1 and P2 fall for the second time, pin P2 again falls into the hole H and closes contacts C2. Relays Z2 and W2 being operated, as described above, relay AL operates over a circuit extending from battery through the winding of said relay, front contacts of relay Z2, and contacts C2 to ground. The indicator or other device NG, which may be of any suitable form, is then actuated by ground through upper front contacts of relay W2, and upper front contacts of relay AL, indicating failure of the drum D to step. Relay AL may lock up through its lower front contacts to ground to ensure repeated operation of the indicator NG and prevent operation of the indicator OK until relay AL is released by any suitable means.

Assuming, however, that drum D has stepped properly when the pins P1 and P2 are raised, contacts C1 are thereby opened and relay Z1 operates in series with relay W1 through lower contacts of relay W1 and upper back contacts of relay W2 to ground. The drum D should now be stepped a half revolution in preparation for the next recording operation. If it is so stepped, then when pins P1 and P2 are again lowered, pin P2 falls into the hole H and closes contacts C2. Relay W2 thereupon operates, as previously described, its upper back contacts opening the circuit of and releasing relays W1 and Z1. The indicator OK is actuated by ground through upper front contacts of relay W2 and upper back contacts of relay AL, indicating that drum D has stepped properly. Relay Z2 operates when contacts C2 open, as previously described, and the action continues in the manner described above during succeeding operations of the recorder.

However, if drum D has not turned from its previous position when pins P1 and P2 fall for the third time, as described above, pin P1 again falls into the hole H1 and closes contacts C1. Relays W1 and Z1 being operated, as described above, relay AL operates over a circuit extending from battery through the winding of said relay, front contacts of relay Z1, and contacts C1 to ground. The indicator or other device NG is actuated by ground through upper front contacts of relay W1 and upper front contacts of relay AL, indicating failure of the drum D to step.

Fig. 2 shows an alternate arrangement of the indicating circuit, dispensing with the relay AL of Fig. 1. Relays W3, Z3, W4 and Z4 operate in the same manner as described above for relays W1, Z1, W2 and Z2, respectively. That is, relay W3 operates when contacts C1 close, releasing relays W4 and Z4, if operated, and relay Z3 operates when contacts C1 open. Relay W4 operates when contacts C2 close, releasing relays W3 and Z3, if operated, and relay Z4 operates when contacts C2 open. The indicator OK is actuated when relay W3 is operated and relay Z3 not operated, by ground through upper contacts of relay Z3 and upper contacts of relay W3, and is similarly actuated when relay W4 is operated and relay Z4 not operated. The indicator NG is actuated if contacts C1 close when relay Z3 is operated or if contacts C2 close when relay Z4 is operated. The operation of this circuit in conjunction with the recorder of Fig. 1 will be understood from the foregoing description of the circuit of Fig. 1.

While I have illustrated my invention by specific embodiments thereof and in connection with a particular type of recorder, it is not limited to the type of recorder shown nor to the specific arrangements herein disclosed. It is equally applicable in connection with other types of recorder with record-feeding means having movements of translation rather than rotation or other dispositions of the operating parts. It may be applied to devices of a similar character used for reading records rather than for producing them. Equivalent means may be substituted for some of the parts shown, as pointed out above. Other modifications and adaptations of the invention will be apparent to those skilled in the art. The terms and expressions which I have used in reference to this invention are used as terms of description and not of limitation and I have no intention in the use of such terms and expressions of excluding thereby equivalents of the features shown and described or portions thereof but, on the contrary, intend to include therein any and all equivalents and modifications which may be employed without departing from the spirit of the invention.

What is claimed is:

1. In a recording device, a record medium, a movable member for advancing said medium to successive recording positions, said member having a notch disposed in the surface thereof for each recording position, a pair of cam-actuated feeler pins disposed to engage said notches in succession whereby in any recording position one of said feeler pins engages the notch associated with said recording position and at the next recording position the other of said feeler pins engages the notch associated with said next recording position, a pair of electrical contacts for each of said feeler pins closable when the associated feeler pin engages one of said notches, a first pair of counting relays controlled by one of said pairs of contacts and operative in response to the engagement and subsequent disengagement of a notch by the associated feeler pin, a second pair of counting relays controlled by said other pair of contacts and similarly operative in response thereto, and means controlled by the operation of a relay in each of said pairs of counting relays for indicating the movement or failure of movement of said medium from one recording position to the next recording position.

2. In a recording device, a record medium, a movable member for advancing said medium, means for actuating said member to advance said medium, cam-actuated feeler pins adapted to severally contact different parts of said member upon the movement thereof to advance said medium, a circuit comprising a plurality of relays arranged in a counting network and responsive to said feeler pins when severally contacting said different parts of said member upon the movement thereof, and means controlled through said circuit responsive to one of said pins successively contacting the same part of said member for indicating the failure of said member to advance said medium.

3. In a recording device, a record medium, a movable member for advancing said medium, means for actuating said member to advance said medium, cam-actuated feeler pins severally adapted to contact different parts of said member upon the movement thereof to advance said medium, a circuit comprising a plurality of relays arranged in a counting network and responsive to said feeler pins when severally contacting said different parts of said member upon the movement thereof, means controlled by said circuit responsive to the operation of said feeler pins when severally contacting said different parts of said member for indicating the movement of said member, and means controlled by said circuit responsive to the operation of one of said feeler pins successively contacting the same part of said member for indicating the failure of said member to advance.

4. In a recording device, a record medium, a movable member for advancing said medium, said member having a plurality of notched portions, means for actuating said member to advance said medium, cam-actuated feeler pins severally adapted to contact different ones of said plurality of notched portions upon the movement of said member to advance said medium, a circuit comprising a plurality of relays arranged in a counting network and responsive to said feeler pins when severally contacting different ones of said plurality of notched portions upon the movement of said member, means controlled by said circuit responsive to the operation of said feeler pins when severally contacting different ones of said plurality of notched portions for indicating the movement of said member, and means controlled by said circuit responsive to the operation of one of said feeler pins successively contacting the same notched portion on said member for indicating the failure of said member to advance.

ALFRED E. HAGUE.

REFERENCES CITED

The following references are of record in the file of this patent:

UNITED STATES PATENTS

| Number | Name | Date |
| --- | --- | --- |
| 2,142,880 | Anderson et al. | Jan. 3, 1939 |
| 2,232,896 | Wilson | Feb. 25, 1941 |
| 2,410,521 | Potts | Nov. 5, 1946 |
| 2,462,655 | McHenry | Feb. 22, 1949 |